Jan. 17, 1956   C. O. CARLSON ET AL   2,730,791
METHOD AND APPARATUS FOR BREAKING SCALE FROM A ROD
Filed May 4, 1953   3 Sheets-Sheet 1
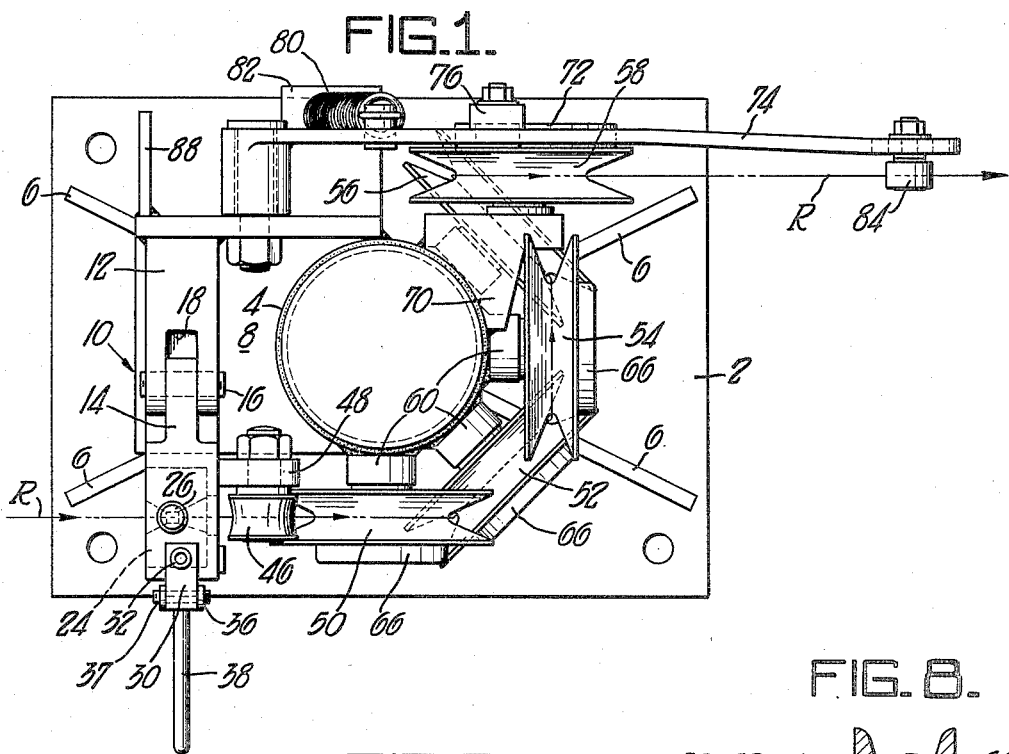
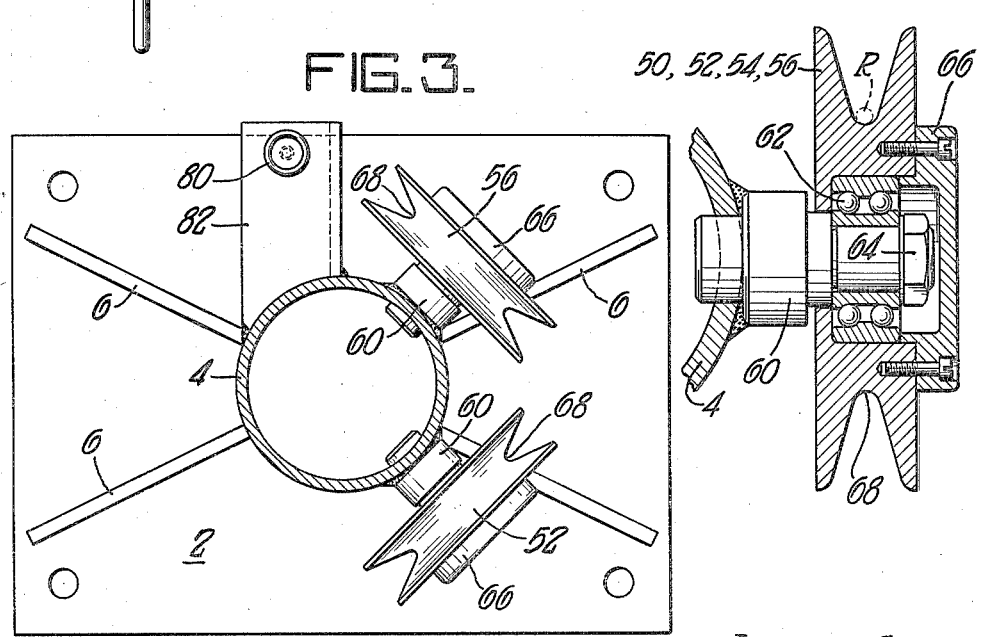
Inventors:
CLARENCE O. CARLSON,
WALTER O. EVERLING and
FRANK E. ROBINSON,
by: Donald G. Dalton
their Attorney

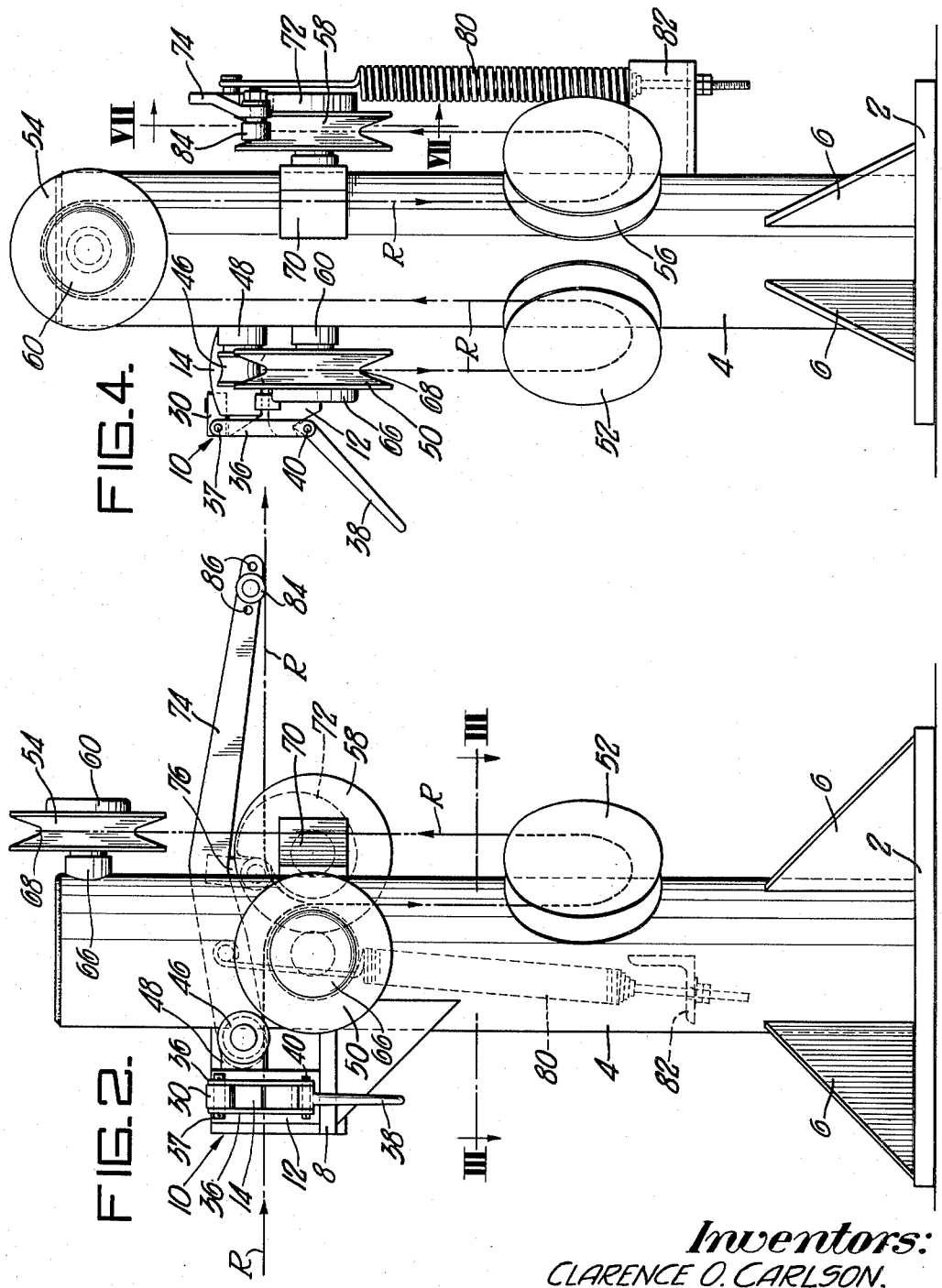

Jan. 17, 1956  C. O. CARLSON ET AL  2,730,791
METHOD AND APPARATUS FOR BREAKING SCALE FROM A ROD
Filed May 4, 1953  3 Sheets-Sheet 3
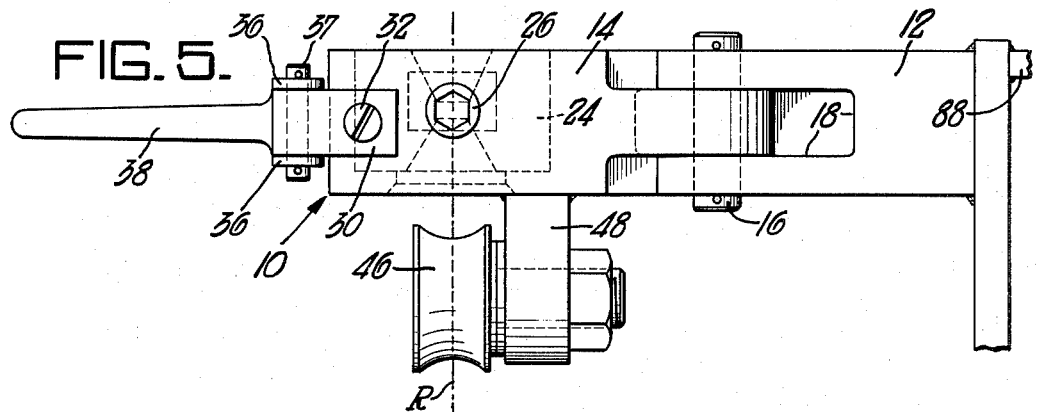
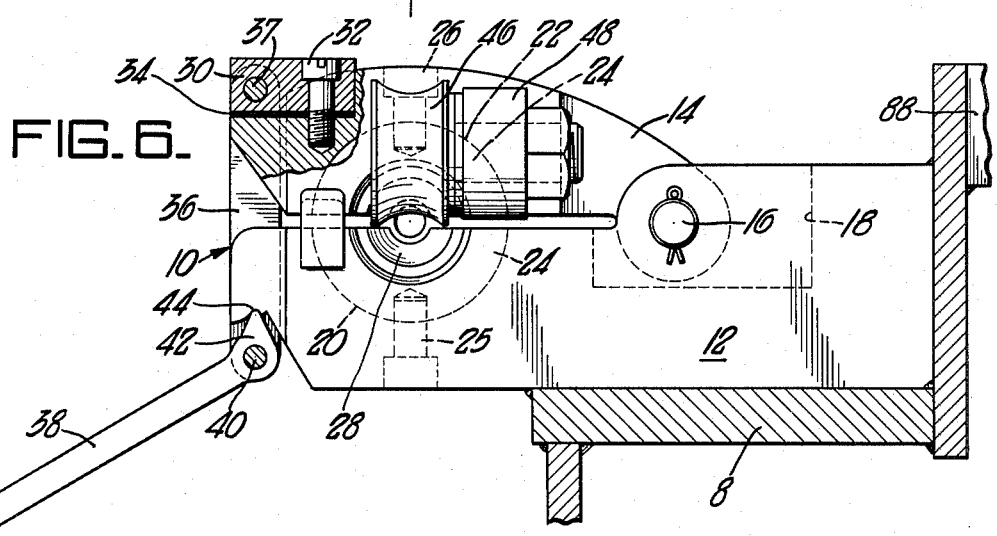
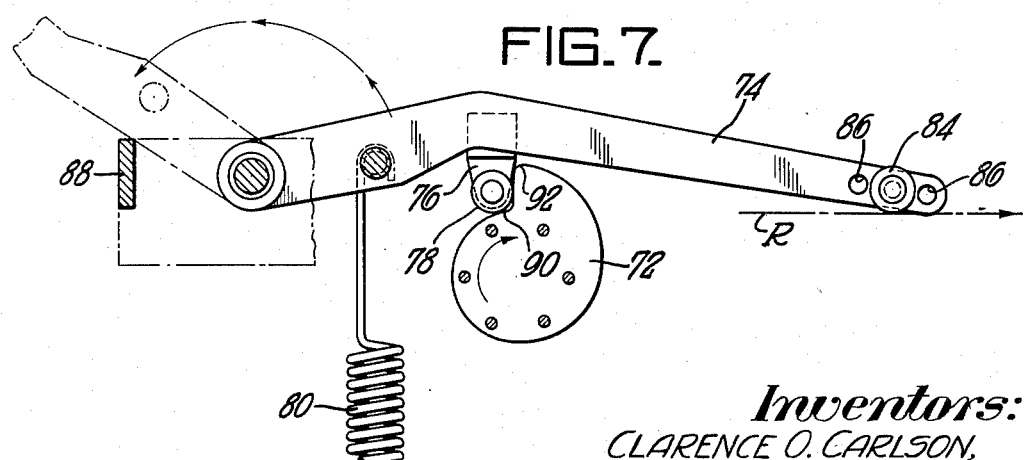
*Inventors:*
CLARENCE O. CARLSON,
WALTER O. EVERLING and
FRANK E. ROBINSON,
by: Donald G. Dalton
  *their Attorney.*

United States Patent Office 2,730,791
Patented Jan. 17, 1956

2,730,791

METHOD AND APPARATUS FOR BREAKING SCALE FROM A ROD

Clarence O. Carlson, Chagrin Falls, and Walter O. Everling and Frank E. Robinson, Shaker Heights, Ohio, assignors to United States Steel Corporation, a corporation of New Jersey Application May 4, 1953, Serial No. 352,928

12 Claims. (Cl. 29—81)

This invention relates to a method and apparatus for breaking scale from a rod or the like and more particularly to the removal of scale from a hot rolled steel rod prior to wire drawing and/or galvanizing or otherwise coating the rod. The most common way of removing such scale is by pickling it in an acid solution. However, it is advantageous to use a mechanical scale breaker inasmuch as costly handling steps are reduced to a minimum and expensive acid pickling solutions together with the necessary pickling tanks and cranes are eliminated. Mechanical scale breakers are not broadly new but those which have been used, to our knowledge, are not satisfactory either because they are too bulky and costly to maintain or because they do not remove the scale to the required degree.

It is therefore an object of our invention to provide an inexpensive, compact, mechanical scale breaker which will efficiently remove scale from hot rolled rods.

Another object is to provide a guide for use with said scale breaker.

A further object is to provide apparatus for knocking off loose scale from the rod after it has passed through the scale breaker.

Still another object is to provide a method of removing scale from a hot rolled roll.

These and other objects will be more apparent after referring to the following specification and attached drawings, in which:

Figure 1 is a top plan view of our device;

Figure 2 is a side elevation of the device of Figure 1 looking toward the top of the sheet;

Figure 3 is a view taken on the line III—III of Figure 2;

Figure 4 is a side elevation looking from the right of Figure 2;

Figure 5 is a plan view of the guide mechanism for the scale breaker;

Figure 6 is an elevation, partly in section, of the guide of Figure 5;

Figure 7 is a view taken on the line VII—VII of Figure 4; and

Figure 8 is a sectional view of the breaker sheaves.

Referring more particularly to the drawings, the reference numeral 2 indicates the base plate of the scale breaker of our invention. The base plate may be fastened to the floor in any suitable manner, such as by means of bolts. A tubular post 4 is fastened to and extends upwardly from the base plate 2. Suitable reinforcing plates 6 are welded to and extend between base plate 2 and post 4. A bracket 8 is welded to the post 4 adjacent the top thereof for supporting a split guide assembly 10. As best shown in Figures 5 and 6 the assembly 10 consists of a base member 12 fastened to the bracket 8 and a clamp member 14 pivoted thereto by means of a pin 16. The base member 12 is provided with an opening 18 for receiving the end of the clamp member 14. The members 12 and 14 have complementary grooves 20 and 22 for receiving split guides 24 which are clamped in place by means of cap screws 25 and 26, respectively. The assembled guides 24 have an opening 28 therethrough which tapers inwardly from both ends to a diameter approximately the size of the rod R being treated. A block 30 is mounted on the member 14 and is fastened thereto by means of a cap screw 32. The elevation of the top of the block 30 may be varied by means of shims 34. A pair of links 36 are pivotally mounted on the block 30 by means of a pin 37. A lever 38 is pivotally connected to the lower end of links 36 by means of a pin 40. Lever 38 is provided with a portion 42 which is received in a socket portion 44 on the member 12 in order to clamp the members 12 and 14 together. A guide roller 46 is mounted on a bracket 48 attached to the member 14.

A sheave 50 is mounted on the post 4 adjacent the roller 46. Similar sheaves 52, 54, 56 and 58 are also mounted on the post 4; the sheaves 50 and 58 being mounted parallel to each other in the same horizontal plane on opposite sides of the post, the sheaves 52 and 56 being mounted in the same horizontal plane at an angle to each other and to sheaves 50, 54 and 58 and the sheave 54 being mounted at the top of the post 4 at right angles to the sheaves 50 and 58 in a vertical plane between the sheaves 52 and 56. As shown in Figure 8, the sheaves 50, 52, 54, 56 are attached to the post 4 by means of a stub shaft 60 welded to the post 4. The shaft 60 carried bearings 62 on which the sheave is supported. The bearings are held in place on the shaft 60 by means of a nut 64 threaded on the shaft. A cover 66 is secured to the outside of the sheave by means of cap screws. The bottom of the groove 68 in each of the sheaves is substantially circular and has a radius substantially equal to that of the rod R being treated. The sheave 58 is secured to a bracket 70 mounted on the post 4. The mounting of sheave 58 is otherwise the same as that of the mounting of sheave 50, 52, 54 and 56 except that a cam 72 is substituted for the cover 66. A knocker arm 74 is pivotally mounted to the bracket 8 and extends along side the sheave 58. The arm 74 is provided with a downwardly extending arm 76 intermediate its ends for supporting a cam roller 78 which is held in contact with the peripheral surface of the cam 72 by means of a spring 80 having one end attached to the arm 74 and the other end adjustably attached to a bracket 82 which is mounted on the post 4. A roller 84 is mounted on the free end of the arm 74. Several holes 86 are provided in the free end of the arm 74 so that the position of roller 84 may be varied. An arm 88 extends outwardly from the bracket 8 to support the arm 74 when the rod is being threaded through the scale breaker.

The operation of the device is as follows:

The scale breaker is ordinarily positioned between a pay-off reel and a wire drawing machine with the wire drawing machine furnishing the power for drawing the rod through the scale breaker. The rod R coming with the pay-off reel passes through the opening 28 in the guide 24 and under roller 46 to the top of sheave 50. It then passes downwardly around the underside of sheave 52, upwardly over the top of sheave 54, downwardly around the underside of sheave 56, up over the top of sheave 58, beneath the roller 84 and into the first draft of the wire drawing machine. As the rod passes around the sheaves 50, 52, 54, 56 and 58 it first undergoes a 90° bending movement, three combined 180° bending movements and a twisting movement, and a 90° bending movement. This causes the major portion of the scale to crack and fall free of the rod. Most of the scale still adhering to the surface of the rod in the form of loose finely divided particles is jarred therefrom by the action of the knocker roller 84 on arm 74. It will be seen that the rotation of the cam 72 by means of the sheave 58 will cause the knocker arm 74 to gradually rise from the low point 90 on the cam to the high point 92. There is then a sharp drop of the roller from the point 92 to the point 90 which jars the loose scale from the rod R.

While one embodiment of our invention has been shown and described it will be apparent that other adaptations and modifications may be made without departing from the scope of the following claims.

We claim:

1. Apparatus for removing scale from a rod comprising a vertical post, a plurality of sheaves mounted on said post, each of said sheaves having a peripheral groove therein for receiving said rod, said sheaves being arranged around the periphery of said post with the axis of each sheave in different vertical and horizontal planes than the sheave adjacent thereto, said rod passing around at least approximately 90° of each sheave so that scale on said rod is broken therefrom.

2. Apparatus for removing scale from a rod comprising a vertical post, a plurality of sheaves mounted on said post, each of said sheaves having a peripheral groove therein for receiving said rod, said sheaves being arranged around the periphery of said post with the axis of each sheave in different vertical and horizontal planes than the sheave adjacent thereto, said rod passing around at least approximately 90° of each sheave so that scale on said rod is broken therefrom, and means for guiding said rod to the first of said sheaves; said last named means including a pair of pivotally connected members having complementary grooves therethrough, complementary guides assembled in said grooves, said assembled guides having an opening therethrough which tapers inwardly from both ends to a diameter approximately the size of said rod, and clamping means for holding said pair of members together.

3. Apparatus for removing scale from a rod comprising a vertical post, a plurality of sheaves mounted on said post, each of said sheaves having a peripheral groove therein for receiving said rod, said sheaves being arranged around the periphery of said post with the axis of each sheave in different vertical and horizontal planes than the sheave adjacent thereto, said rod passing around at least approximately 90° of each sheave so that scale on said rod is broken therefrom, a pivotally mounted knocker arm supported by said post, a roller on the free end of said arm below which the rod passes after it leaves the last of said sheaves, a cam roller mounted on said arm intermediate its ends, a cam mounted on the last of said sheaves for rotation therewith, a spring having one end attached to said arm and the other end attached to said post to hold the cam roller in contact with the surface of said cam, the cam surface gradually rising from its low point to its high point and then abruptly falling from its high point to its low point whereby the roller on said knocker arm strikes a blow on said rod to jar the loose scale therefrom.

4. Apparatus for removing scale from a rod comprising a vertical post, a plurality of sheaves mounted on said post, each of said sheaves having a peripheral groove therein for receiving said rod, said sheaves being arranged around the periphery of said post with the axis of each sheave in different vertical and horizontal planes than the sheave adjacent thereto, said rod passing around at least approximately 90° of each sheave so that scale on said rod is broken therefrom, a pivotally mounted knocker arm supported by said post, a roller on the free end of said arm below which the rod passes after it leaves the last of said sheaves, a cam roller mounted on said arm intermediate its ends, a cam mounted on the last of said sheaves for rotation therewith, a spring having one end attached to said arm and the other end attached to said post to hold the cam roller in contact with the surface of said cam, the cam surface gradually rising from its low point to its high point and then abruptly falling from its high point to its low point whereby the roller on said knocker arm strikes a blow on said rod to jar the loose scale therefrom, and means for guiding said rod to the first of said sheaves; said last named means including a pair of pivotally connected members having complementary grooves therethrough, complementary guides assembled in said grooves, said assembled guides having an opening therethrough which tapers inwardly from both ends to a diameter approximately the size of said rod, and clamping means for holding said pair of members together.

5. Apparatus for removing scale from a rod comprising a vertical post, five sheaves mounted on said post, each of said sheaves having a peripheral groove therein for receiving said rod, said sheaves being arranged around the periphery of said post with the axis of each sheave in different vertical and horizontal planes than the sheave adjacent thereto, the second and fourth of said sheaves being located below the first sheave, the third sheave being located above the first sheave, the fifth sheave being located above the fourth sheave, said rod passing downwardly around an arc of approximately 90° of the first sheave to the second sheave, beneath the second sheave around an arc of approximately 180° thereof, upwardly to the third sheave, above the third sheave around an arc of approximately 180° thereof, downwardly to the fourth sheave, beneath the fourth sheave around an arc of approximately 180° thereof, upwardly to the fifth sheave and around an arc of approximately 90° thereof whereby the scale on the rod is broken therefrom.

6. Apparatus for removing scale from a rod comprising a vertical post, five sheaves mounted on said post, each of said sheaves having a peripheral groove therein for receiving said rod, said sheaves being arranged around the periphery of said post with the axis of each sheave in different vertical and horizontal planes than the sheave adjacent thereto, the second and fourth of said sheaves being located below the first sheave, the third sheave being located above the first sheave, the fifth sheave being located above the fourth sheave, said rod passing downwardly around an arc of approximately 90° of the first sheave to the second sheave, beneath the second sheave around an arc of approximately 180° thereof, upwardly to the third sheave, above the third sheave around an arc of approximately 180° thereof, downwardly to the fourth sheave, beneath the fourth sheave around an arc of approximately 180° thereof, upwardly to the fifth sheave and around an arc of approximately 90° thereof whereby the scale on the rod is broken therefrom, and means for guiding said rod to the first of said sheaves; said last named means including a pair of pivotally connected members having complementary grooves therethrough, complementary guides assembled in said grooves, said assembled guides having an opening therethrough which tapers inwardly from both ends to a diameter approximately the size of said rod, and clamping means for holding said pair of members together.

7. Apparatus for removing scale from a rod comprising a vertical post, five sheaves mounted on said post, each of said sheaves having a peripheral groove therein for receiving said rod, said sheaves being arranged around the periphery of said post with the axis of each sheave in different vertical and horizontal planes than the sheave adjacent thereto, the second and fourth of said sheaves being located below the first sheave, the third sheave being located above the first sheave, the fifth sheave being located above the fourth sheave, said rod passing downwardly around an arc of approximately 90° of the first sheave to the second sheave, beneath the second sheave around an arc of approximately 180° thereof, upwardly to the third sheave, above the third sheave around an arc of approximately 180° thereof, downwardly to the fourth sheave, beneath the fourth sheave around an arc of approximately 180° thereof, upwardly to the fifth sheave and around an arc of approximately 90° thereof whereby the scale on the rod is broken therefrom, a pivotally mounted knocker arm supported by said post, a roller on the free end of said arm below which the rod passes after it leaves the last of said sheaves, a cam roller mounted on said arm intermediate its ends, a cam mounted on the last of said sheaves for rotation therewith, a spring having one end attached to said arm and the other end attached to said post to hold the cam roller in contact with the surface of said cam, the cam surface gradually rising from its low point to its high point and then abruptly falling from its high point to its low point whereby the roller on said knocker arm strikes a blow on said rod to jar the loose scale therefrom.

8. Apparatus for removing scale from a rod comprising a vertical post, five sheaves mounted on said post, each of said sheaves having a peripheral groove therein for receiving said rod, said sheaves being arranged around the periphery of said post with the axis of each sheave in different vertical and horizontal planes than the sheave adjacent thereto, the second and fourth of said sheaves being located below the first sheave, the third sheave being located above the first sheave, the fifth sheave being located above the fourth sheave, said rod passing downwardly around an arc of approximately 90° of the first sheave to the second sheave, beneath the second sheave around an arc of approximately 180° thereof, upwardly to the third sheave, above the third sheave around an arc of approximately 180° thereof, downwardly to the fourth sheave, beneath the fourth sheave around an arc of approximately 180° thereof, upwardly to the fifth sheave and around an arc of approximately 90° thereof whereby the scale on the rod is broken therefrom, a pivotally mounted knocker arm supported by said post, a roller on the free end of said arm below which the rod passes after it leaves the last of said sheaves, a cam roller mounted on said arm intermediate its ends, a cam mounted on the last of said sheaves for rotation therewith, a spring having one end attached to said arm and the other end attached to said post to hold the cam roller in contact with the surface of said cam, the cam surface gradually rising from its low point to its high point and then abruptly falling from its high point to its low point whereby the roller on said knocker arm strikes a blow on said rod to jar the loose scale therefrom, and means for guiding said rod to the first of said sheaves; said last named means including a pair of pivotally connected members having complementary grooves therethrough, complementary guides assembled in said grooves, said assembled guides having an opening therethrough which tapers inwardly from both ends to a diameter approximately the size of said rod, and clamping means for holding said pair of members together.

9. Apparatus for knocking loose scale from a rod leaving a descaler comprising a pivotally mounted knocker arm, a roller on the free end of said arm below which the rod passes after it leaves the descaler, a cam roller mounted on said arm intermediate its ends, a rotary cam mounted adjacent said cam roller, means for holding said cam roller in contact with the surface of said cam, the cam surface gradually rising from its low point to its high point and then abruptly falling from its high point to its low point whereby the roller on said knocker arm strikes a blow on said rod to jar the loose scale therefrom.

10. The method of removing scale from a rod comprising bending the rod around an arc of approximately 90°, then bending the rod around three arcs of approximately 180° while at the same time twisting the rod, and then bending the rod around an arc of approximately 90°.

11. The method of removing scale from a rod comprising bending the rod around an arc of approximately 90°, then bending the rod around three arcs of approximately 180° while at the same time twisting the rod, then bending the rod around an arc of approximately 90°, and then striking the rod to knock loose scale therefrom.

12. The method of removing scale from a rod comprising bending the rod around an arc of approximately 90°, then bending the rod around a plurality of arcs of approximately 180° while at the same time twisting the rod, and then bending the rod around an arc of approximately 90°.

References Cited in the file of this patent

UNITED STATES PATENTS

| | | |
|---|---|---|
| 235,261 | Leigh | Dec. 7, 1880 |
| 761,634 | Hungerford et al. | May 31, 1901 |
| 926,002 | Janssen | June 22, 1909 |
| 1,647,499 | Bly | Nov. 1, 1927 |
| 2,135,200 | Reeves | Nov. 1, 1938 |
| 2,620,496 | Peignier | Dec. 9, 1952 |